(12) United States Patent
Megiddo et al.

(10) Patent No.: US 6,658,535 B1
(45) Date of Patent: Dec. 2, 2003

(54) NON-INTERFERING SEEK BEHAVIOR MODIFICATION FOR IMPROVED HARD DRIVE PERFORMANCE

(75) Inventors: Nimrod Megiddo, Palo Alto, CA (US); Spencer Ng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,206

(22) Filed: Jan. 19, 2000

(51) Int. Cl.$^7$ .............................................. G06F 12/00
(52) U.S. Cl. ........................ 711/137; 711/112; 712/207
(58) Field of Search ........................ 711/112, 111, 137, 711/113; 712/207

(56) References Cited

U.S. PATENT DOCUMENTS

| | | |
|---|---|---|
| 4,310,882 A | 1/1982 | Hunter et al. |
| 5,761,692 A | 6/1998 | Ozden et al. |

FOREIGN PATENT DOCUMENTS

| | | |
|---|---|---|
| GB | 2328780 | 3/1999 |

*Primary Examiner*—Matthew Kim
*Assistant Examiner*—Matthew D. Anderson
(74) *Attorney, Agent, or Firm*—Lacasse & Associates, LLC; Randy W. Lacasse; Mark M. McCabe, Esq.

(57) ABSTRACT

Upon receiving a read command, a disk drive moves a read head to target data and reads the data into a read buffer. In an action called "prefetching", the drive continues to read nearby data into the read buffer which doubles as a data cache. When another I/O command is present and must be serviced, prefetching is preempted thereby reducing the data read into the cache. Moving the head from the current I/O command to the next I/O command creates a delay comprising two components: seek time and rational latency. Based on the relative values of these components, a time period, less than the entire delay period, is calculated in which prefetching will continue. By continuing prefetching instead of preempting it, the likelihood of cache hits is increased because more data is available in the read buffer. Furthermore, by performing prefetching during part of the otherwise unused delay period, no performance penalty is introduced.

17 Claims, 8 Drawing Sheets

NON-INTERFERING SEEK BEHAVIOR MODIFICATION FOR IMPROVED HARD DRIVE PERFORMANCE

BACKGROUND OF THE INVENTION

1. Field of Invention

The present invention generally relates to rotating disk type storage devices. The method and apparatus of this invention have particular application to enhancing a disk's performance.

2. Discussion of Prior Art

Rotating magnetic storage devices typically comprise at least one platter with multiple concentric tracks divided into a plurality of sectors. A read/write head travels across the surface of the platter in response to disk controller commands and positions itself over a sector or group of sectors. Moving a head from the ending of one command to the beginning of the next command is known as a "seek".

The time it takes the head to move from one track to another is usually referred to as seek time. The time it takes for a target sector to rotate until it is positioned under the head is referred to as rotational latency.

Prior art references relating to rotating magnetic storage media recognize that delays due to head positioning, which occur between data storage/retrieval commands, adversely affect throughput rates for disk systems. As seen in the specific patents discussed below, solutions have been proposed to reduce, eliminate or minimize such adverse effects.

In contrast, the present invention does not try to reduce seek time but uses the time between two commands to improve disk performance.

U.S. Pat. No. 4,310,882 issued to Hunter et al., describes a legacy fixed-disk assembly which requires a host system to instruct the disk on basic functions. In such a system, movement commands had a severe overhead penalty which was addressed by holding seek commands until another movement command was received and then executing both commands.

U.S. Pat. No. 5,761,692 issued to Ozden et al., describes a method of re-ordering disk access requests in order to reduce seek time and a method of "roll mode reading" to avoid rotational latency. However, no teaching of intelligently using rotational latency to improve future read performance is provided by this reference.

DE 19839031, and its equivalent GB 2328780, teach saving power by slowing a disk's head movement to accommodate both seek time and rotational latency. The head is positioned over a target sector "just-in-time"; however, no intelligent use of the rotational latency period to acquire data is taught.

Whatever the precise merits and features of the prior art in this field, the earlier art does not achieve or fulfill the purposes of the present invention. The prior art does not provide for delaying a seek for a disk access command, based on a rotational latency time period, in order to improve disk performance.

SUMMARY OF THE INVENTION

Modern disk drives typically prefetch data to populate a cache. When multiple I/O commands are queued, however, prefetching is usually preempted thereby reducing the data available for cache hits. The present invention calculates the seek-time and rotational latency between successive I/O commands and determines what prefetching can be accomplished without affecting data throughput.

DESCRIPTION OF THE PREFERRED EMBODIMENTS

Figure 1:
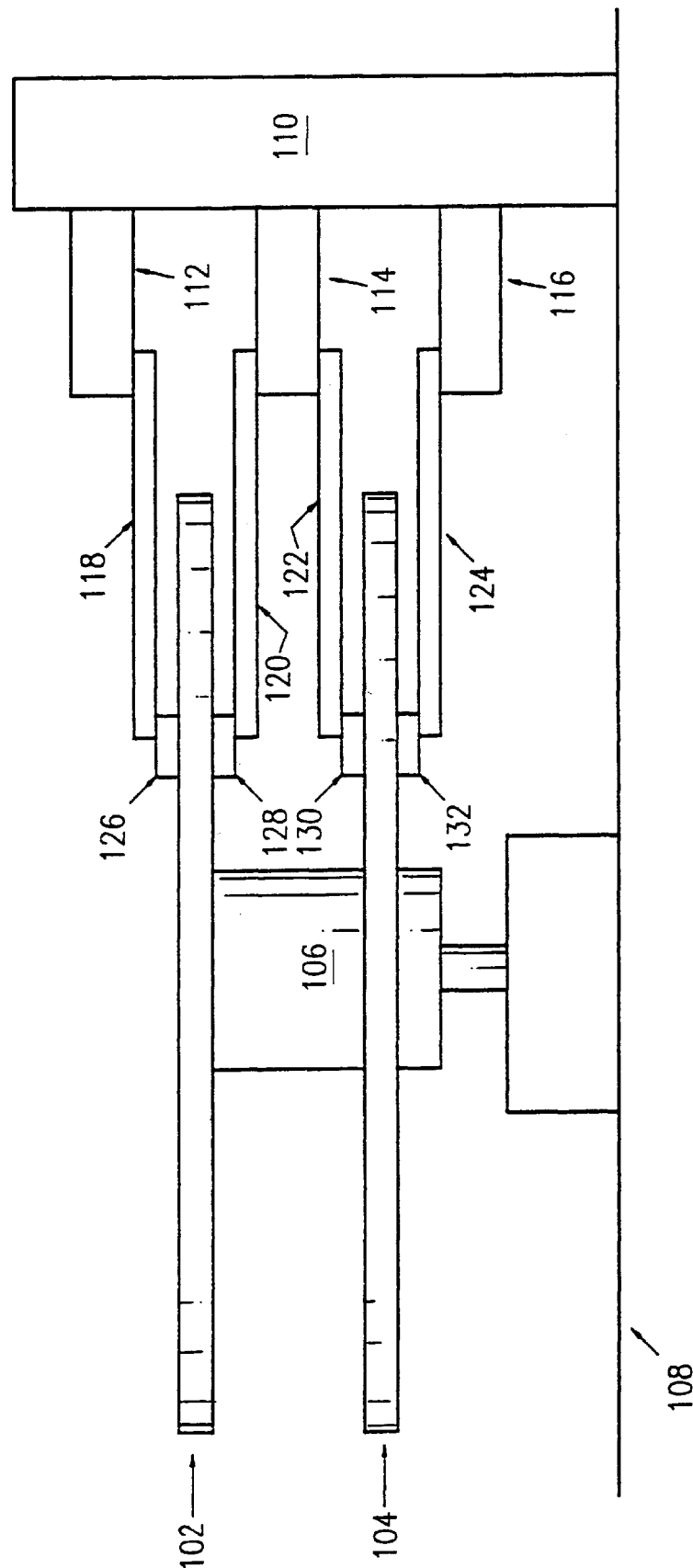
FIG. 1 illustrates the major sub-assemblies of a disk drive which utilizes the present invention.

While this invention is illustrated and described in a preferred embodiment, the device may be produced in many different configurations, forms and materials. There is depicted in the drawings, and will herein be described in detail, a preferred embodiment of the invention, with to the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention. For example, a preferred embodiment is described below in terms of a magnetic recording media; the present invention also applies to optical storage devices having concentric recording tracks.

An inside view of a hard disk drive which benefits from the present invention is illustrated in FIG. 1. Disk platters 102 and 104 are rotatable by spindle motor 106 which rests on base 108. Support shaft 110 has arms 112, 114 and 116 and flexures 118, 120, 122, and 124 which terminate in read/write transducer heads 126, 128, 130 and 132 respectively.

A number of different specific types of physical components are contemplated within the scope of the present invention. Disk platters 102 and 104 are typically constructed of either a glass-ceramic composite or aluminum-alloy. Furthermore, the magnetically retentive media on platters 102 and 104 is preferably a thin-film media, either sputtered or plated, but functionally equivalent oxide media and others are also within the scope of the present invention. Magneto-Resistive (MR) heads generally provide better performance; however, other functionally equivalent heads include, but are not limited to, ferrite heads, metal-in-gap heads, and thin-film heads. The head actuators are preferably voice coil motors (VCM), as depicted in FIG. 2, although a stepper motor is one functionally equivalent alternative.

Figure 2:
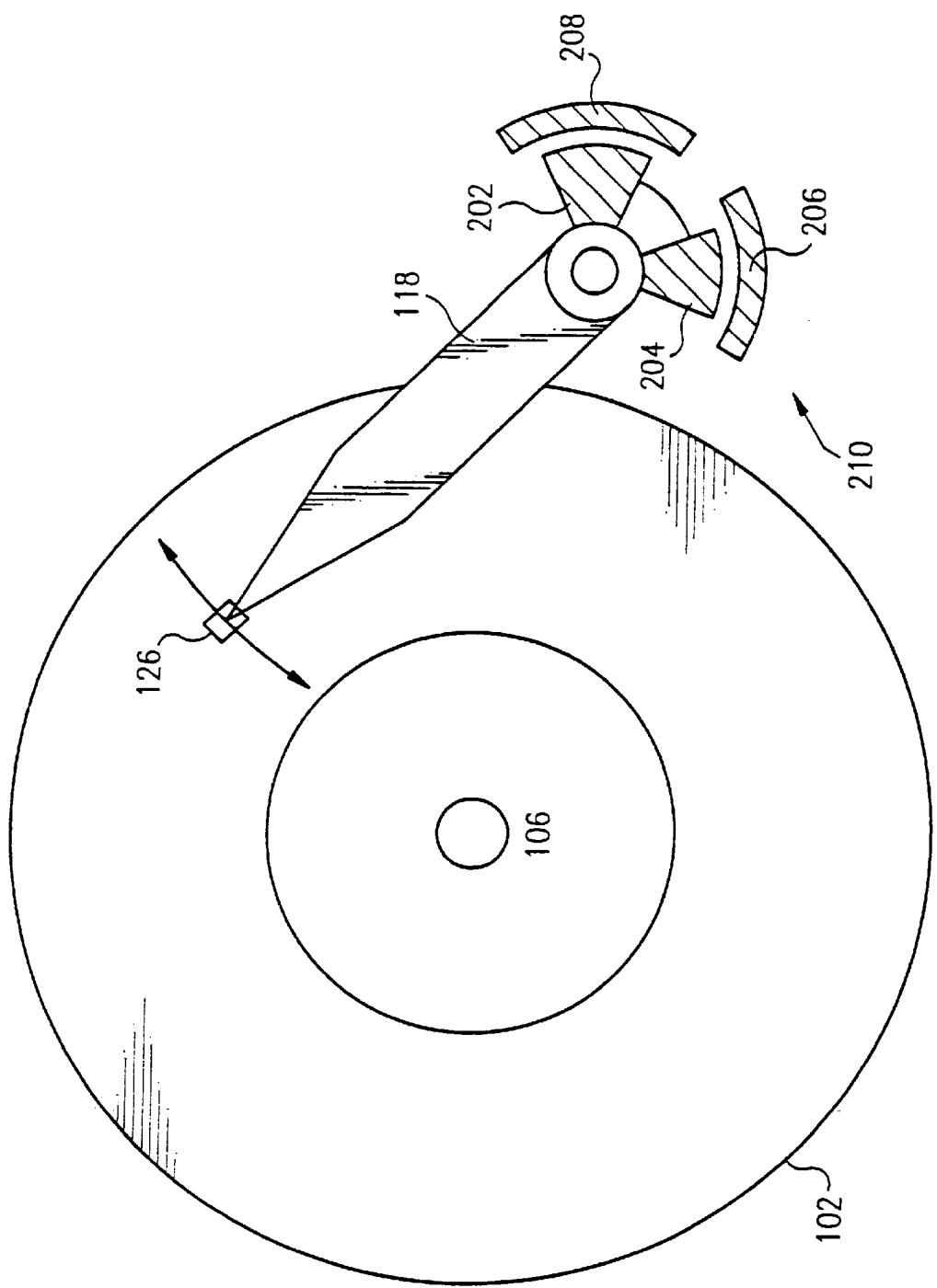
FIG. 2 illustrates a top view of details regarding a disk platter and head mechanism for the disk drive of FIG. 1.

FIG. 2 illustrates a top-view of single disk platter 102 with VCM actuator 210. Actuator 210 is comprised of movable coils 202 and 204 and stationary magnetic circuits 206 and 208. Energizing motor 210 causes head 126 to travel across the surface of platter 102.

Data is organized on the disk platters 102 and 104 in concentric rings called tracks. The tracks are themselves further divided into sectors.

The number of tracks on a disk varies from around a hundred to more than one thousand depending on the manufacturer. Historically, IBM compatible disk formats have 17 sectors per track; however, since the mid-1990s disks having over 100 sectors per track have become common and this number continues to grow even higher as technology advances.

Figure 3:
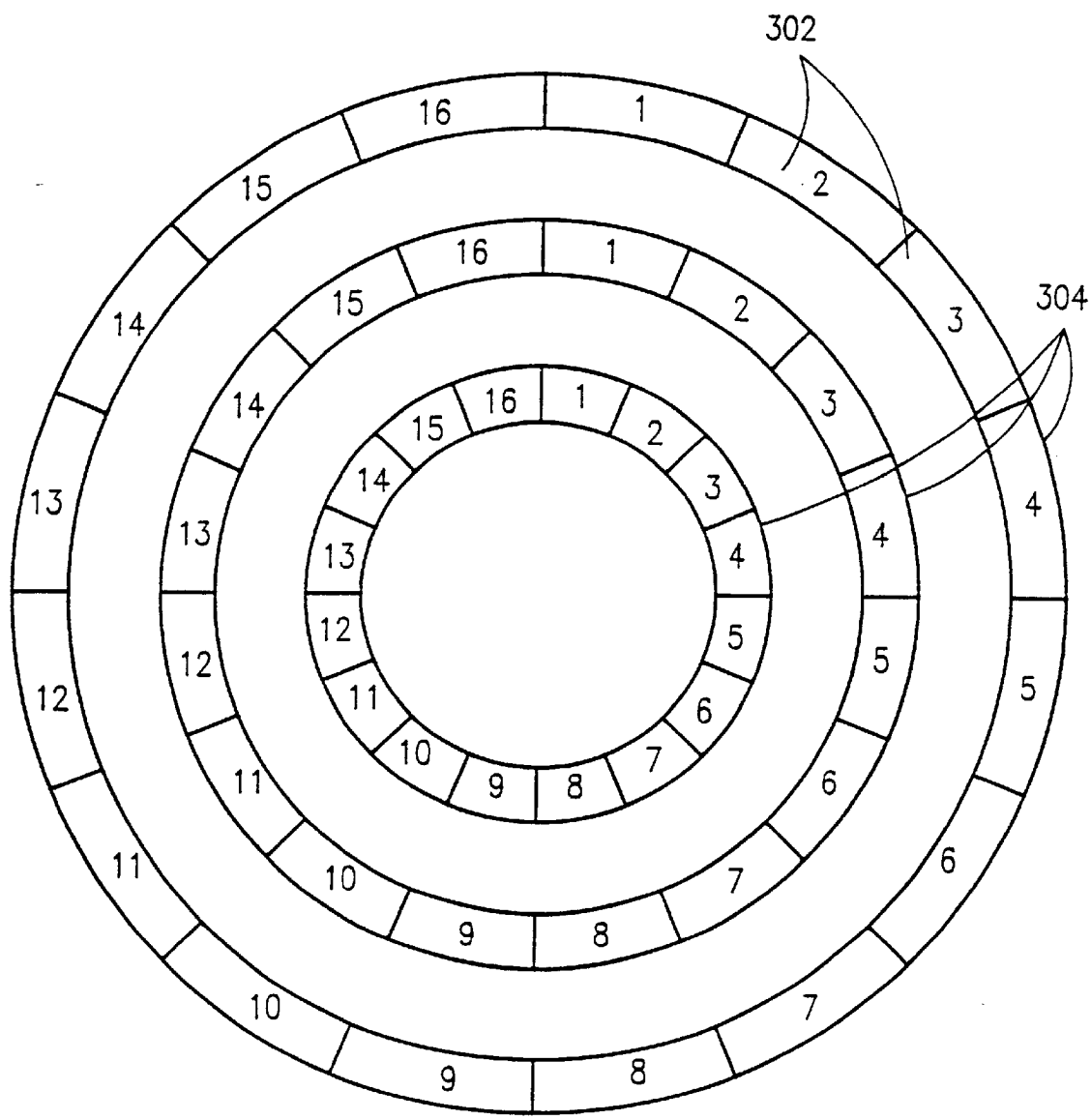
FIG. 3 illustrates an idealized physical sector layout for a disk platter having 3 tracks of 16 sectors each.

FIG. 3 illustrates a simplified view of the physical track layout of a disk platter. There are 3 tracks 304 depicted, each with 16 sectors 302. As depicted, like numbered sectors occur at the same angular location in each track; in practice, however, there is skew from one track to the next to account for head settle delays.

Figure 4:
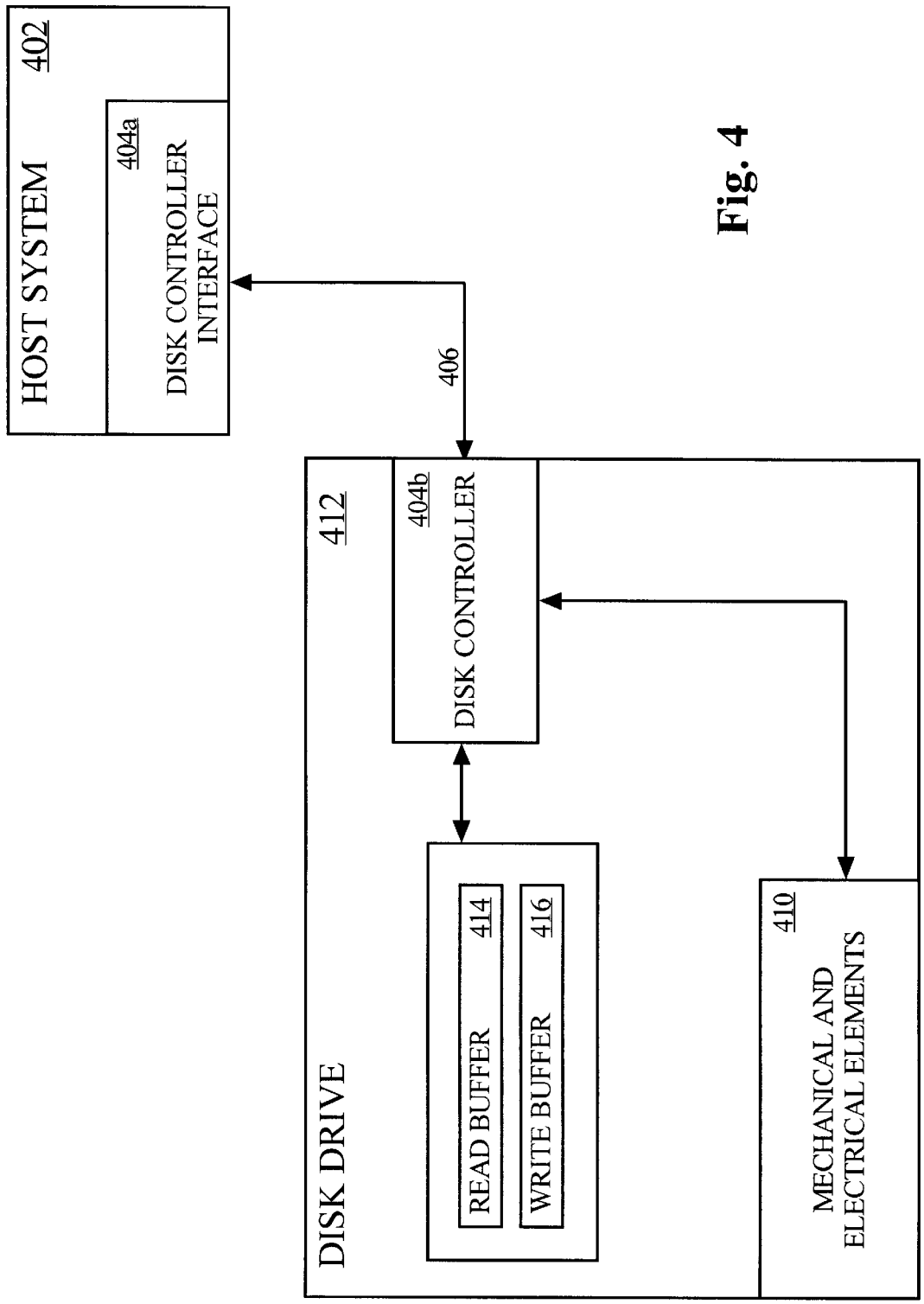
FIG. 4 illustrates a computer system incorporating a disk drive embodying the present invention.

FIG. 4 illustrates a system view of an embodiment of the present invention. Host system 402 is typically a computer system which a user interfaces with and comprises a display, memory and other components not explicitly shown. However, multiple, networked hosts and other systems which are interfaced with indirectly are also contemplated within the scope of the present invention.

Regardless of the exact type of host system involved, it includes disk controller interface 404a which is connected to disk drive 412 by medium 406. Specifically, interface 404a is connected to disk controller 404b. Medium 406 is typically a cable but other technology, including but not limited to backplane sockets and network connections, are also contemplated within the present invention.

Disk controller 404b, in conjunction with disk controller interface 404a, generate the data, commands and signals that control the mechanical and electrical drive elements denoted as element 410 and more fully described in relation to FIGS. 1 through 3.

Disk drives 412 which benefit from the present invention preferably have, integrated therein, memory buffers 414 and 416 which help shuttle data between the disk head and host system 402. In particular, read buffer 414 receives data read from the disk and holds it until it is forwarded to requesting host 402.

In a typical disk read operation, data is first requested by host 402. The data request is passed to disk controller 404b and a physical location is identified on a disk platter. The actuator arm, read/write head and disk platter (see FIGS. 1 and 2) are moved appropriately and data sectors are read from the disk and stored in read buffer 414. The data is then forwarded from buffer 414 to requesting host 402.

Furthermore, buffer 414 doubles as a cache. When data is requested, if a current version exists in buffer 414, then the data request is filled from the buffer rather than initiating the entire read procedure described above. Because data found in the cache (a cache hit) is sent at electronic speeds, performance is markedly improved.

Often, data request patterns exhibit a spatial locality of access. This means that if a piece of data is requested, there is an increased probability that some nearby data will also be accessed by a subsequent request in the near future. To improve drive performance by increasing the probability of cache hits for future requests, prefetching is performed. Prefetching is accomplished by continuing a data read operation even after the requested data is fetched. As previously stated, there is a high probability that data immediately following the target data will be the object of a soon-to-be-received request. By continuing a read operation to include this additional data, this data is then available in the buffer (i.e. cache), thereby improving the likelihood of cache hits.

Typically, however, drives terminate any prefetch action when another I/O command is waiting. An I/O command which arrives during prefetching preempts the prefetch and gets executed instead. Some drives even allow command queuing. In this situation, if multiple I/O commands are waiting then prefetching never even begins-the waiting command has priority.

The rationale for a prefetch preemption policy is that since prefetched data may not always be used (and therefore not payoff), it is best not to delay the servicing of a waiting command.

The present invention allows both data prefetching and handling of waiting I/O commands in a non-interfering manner.

Figure 5:
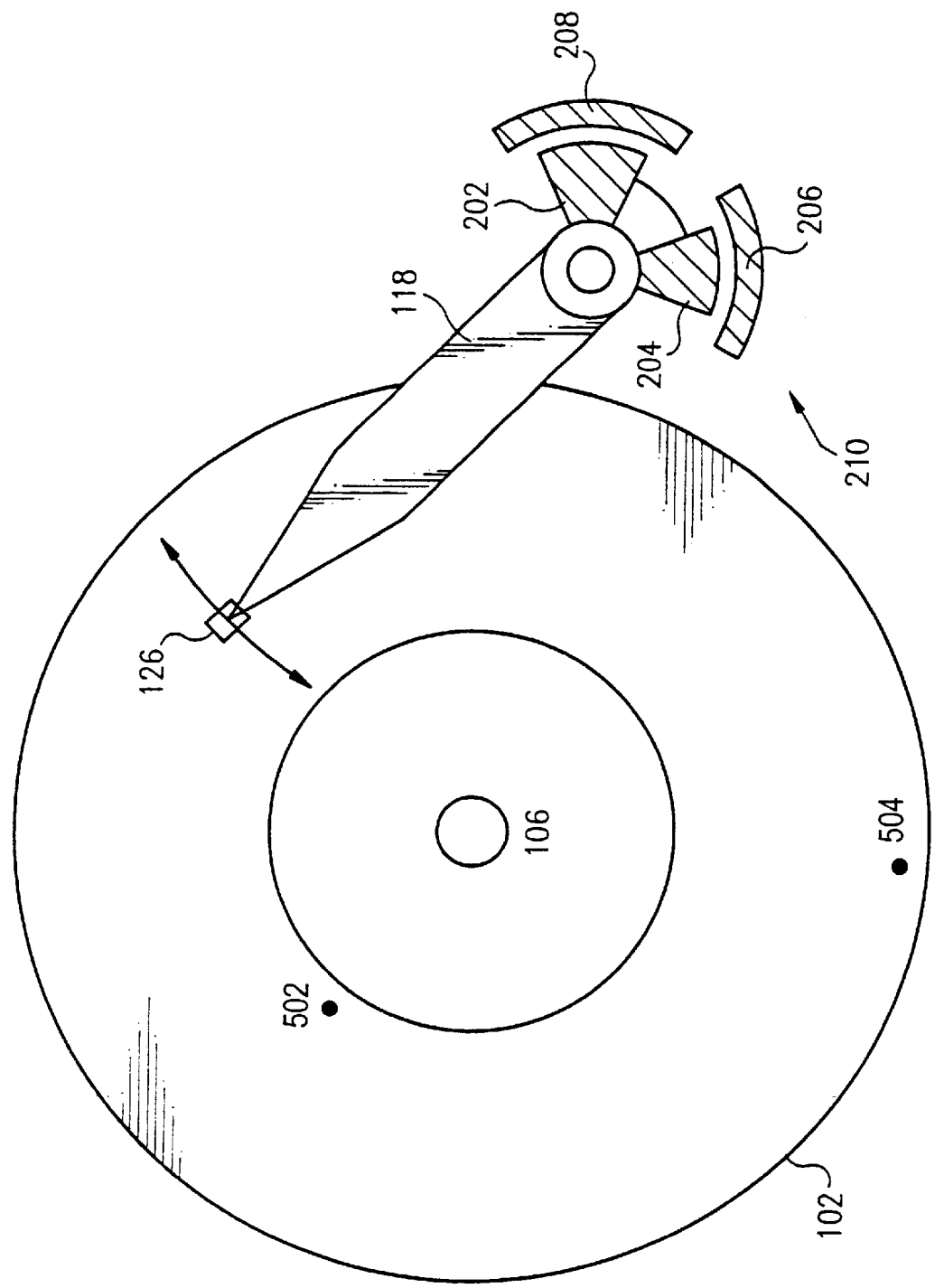
FIG. 5 illustrates the starting and ending location of adjacent I/O commands which access a disk.

FIG. 5 illustrates a disk platter with two particular locations 502 and 504 noted. Location 502 is where the data at the end of a current I/O command resides. Therefore, after completion of this command platter 102 has rotated so that location 502 is positioned directly under head 126.

Location 504 is where the data at the beginning of the next I/O command resides. Therefore, to perform this next command, head 126 must be moved to a position above location 504. Head positioning has two phases. First, head 126 is moved by actuator 210 in a radial direction (seek) across a plurality of concentric tracks on platter 102. Thus, head 126 moves from an inner track associated with location 502 to an outer track associated with location 504.

This radial positioning phase only accomplishes placement of head 126 over the correct track. The second movement phase is actually accomplished by platter 102 which, by its continuous rotation, eventually places location 504 directly under head 126.

The time it takes to move head 126 from a first to a second radial position is called "seek time". Once head 126 is correctly positioned, the time it takes for the target data to rotate under head 126 is known as "rotational latency". The summation of rotational latency and seek time generally provides the amount of time required to reposition head 126 between a current I/O command and a next I/O command.

Figure 6:
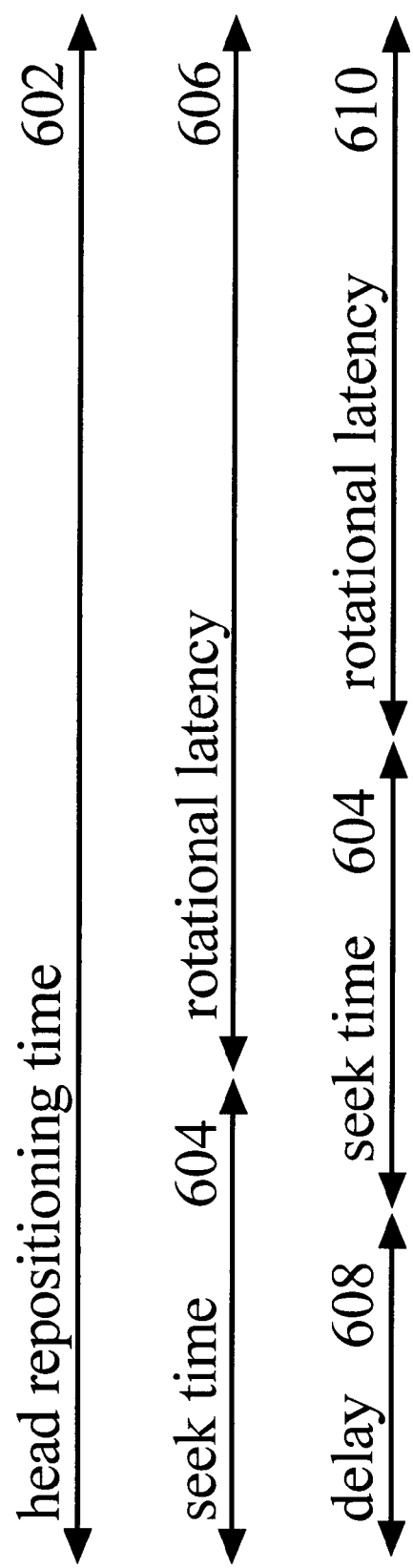
FIG. 6 illustrates the relative relation between head positioning time, seek time and rotational latency.

FIG. 6 graphically represents these time periods. The present invention takes advantage of the fact that the sum 602 of seek time 604 and rotational latency 606 is always greater than the seek time and that the sum 602 is a fixed quantity for any two given I/O commands. As illustrated in FIG. 6, if the seek time is delayed by an amount of time 608 less than or equal to rotational latency, then the rotational latency 610 is reduced by that same amount of time. The sum, or head repositioning time, 602, however, is not increased and therefore handling of the next I/O command is not interfered with and the disk's response time is not affected.

The present invention recognizes that continuing prefetching during delay period 608 allows population of the read buffer/cache (FIG. 4, 412) without interfering with waiting I/O commands.

In one embodiment, however, the present invention also contemplates using additional intelligence to determine when to prefetch and when not to. An intelligent controller, as contemplated within the present invention, maintains statistics regarding areas on the disk which to appear to benefit from prefetching and those which do not.

When the controller determines prefetching would not be beneficial, then delay 608 is not introduced and the disk seek occurs immediately after finishing the present disk access command. As a result of the seek being performed immediately, the disk head is in position to read data preceeding the next disk access command. Such reading occurs during the rotational latency period and is known as "zero-latency read". For some applications, data in the cache because of zero-latency reads also result in cache hits.

Figure 7:
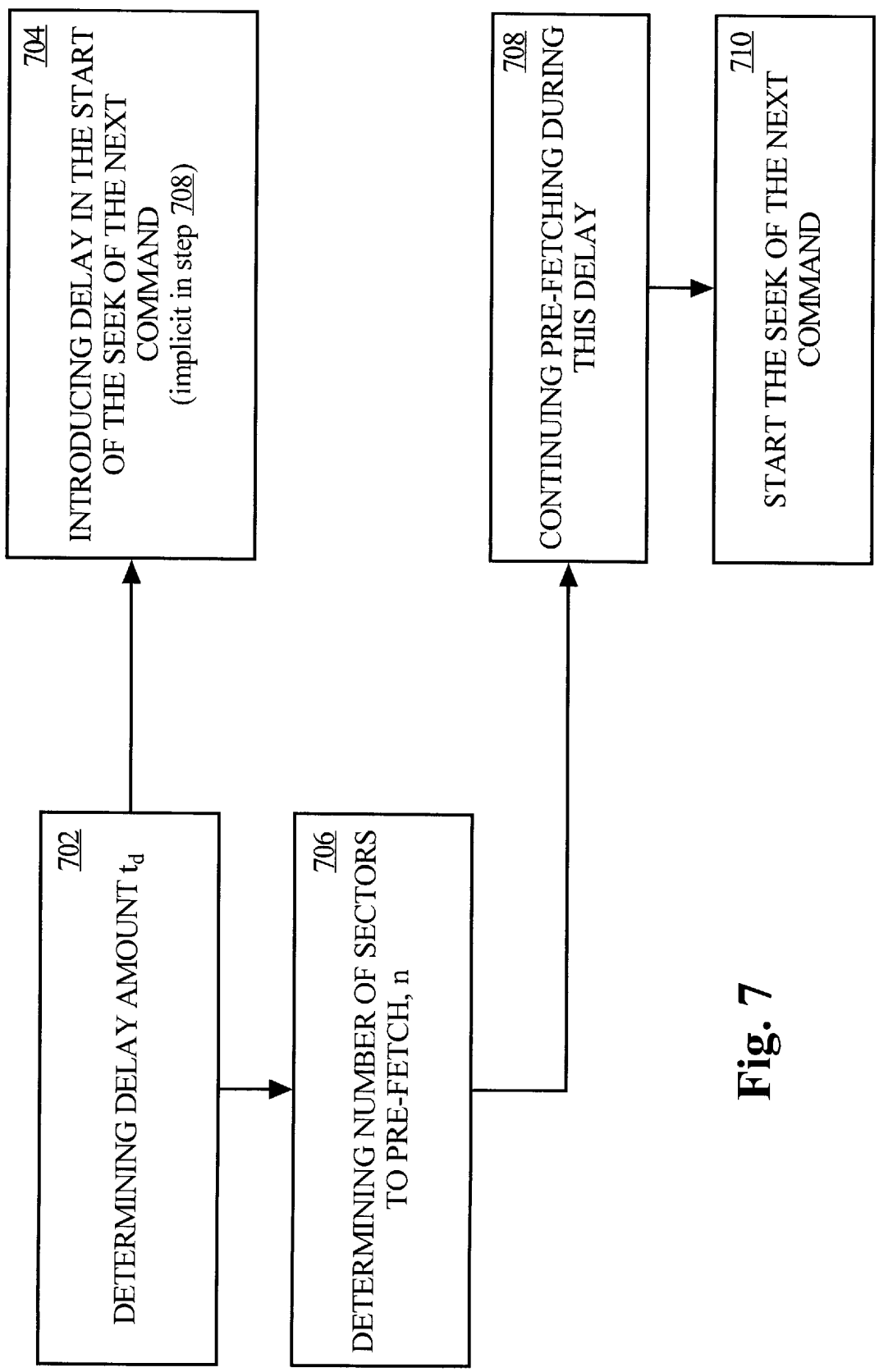
FIG. 7 illustrates a flowchart for delaying a command's seek time according to the present invention.

FIG. 7 illustrates a flowchart of an algorithm for implementing an embodiment of the present invention.

In step 702, the ending data sector of a current command and the beginning data sector of the next, waiting command are used to calculate how long to delay the start of the seek of the next command ($t_d$).

In step 704, the start of the next command's seek is delayed by the period $t_d$, calculated in step 702. While depicted as an explicit step in FIG. 7, this step is actually implicit by the action of step 708.

In step 706, the number of data sectors, n, able to be read during the delay period $t_d$ is calculated according to:

$$n = (t_d/t_{rev})(s_d)$$

where $t_{rev}$ = the time to complete one disk revolution and $s_d$ = the number of data sectors per track.

The present invention contemplates, within its scope, disk drives with a constant sector density as well as drives which use zone formatting. In zone formatting, the number of sectors per track, $s_d$, depends on which zone the track is in. A simple look-up table in a disk controller is typically used to provide this value.

The time for one revolution, $t_{rev}$, is a constant for a particular drive and is usually stored permanently in a controller's microcode.

In step 708, prefetching of n sectors is performed and then in step 710, the seek for the next command is begun.

Figure 8:
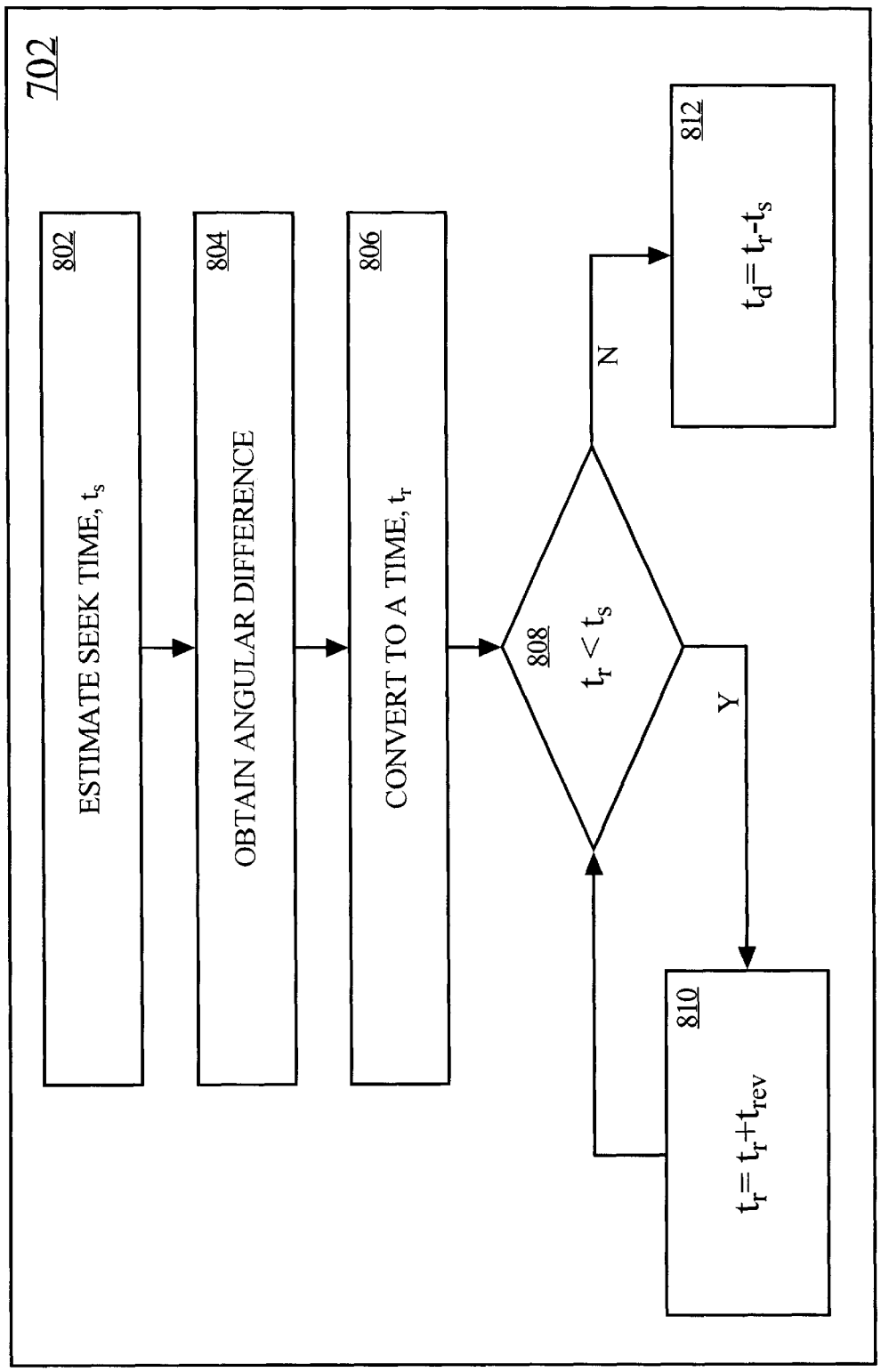
FIG. 8 illustrates a flowchart for calculating a seek delay time according to the present invention.

FIG. 8 provides a flowchart for an algorithm which is used in step 702 to calculate delay, $t_d$.

First in step 802, the seek time, $t_s$, is estimated from the radial position of the current command to the radial position of the next command. The typical method of determining seek time, $t_s$, relies on microcode in the controller to perform a table lookup and other simple calculations. A seek table is usually present which consists of seek times for several major seek distances, in terms of the number of tracks. Seek time for seek distances that falls between two table entries is determined by simple interpolation.

In step 804, the algorithm is continued by subtracting the angular position of the ending location of the current command from the angular position of the beginning location of the next command. While there are many functionally equivalent methods of determining angular position, one of the simplest relies on no-id, or "headerless", formatting and stores angular position information as part of the no-id table.

In step 806, this angular difference is converted into a time, $t_r$, by dividing it by the rotational speed of the drive.

In step 808, $t_r$ and $t_s$ are compared. When $t_s > t_r$, $t_r$ is increased, in step 810, by $t_{rev}$. If needed, step 810 is repeated until $t_r \geq t_s$. Intuitively, these steps capture the fact that rotational latency is calculated only when the head is positioned on the proper track. Once such positioning occurs then the next step of calculating the delay becomes possible. In other words, once $t_s > t_r$ is no longer true, the delay time, $t_d$, is calculated in step 812 according to:

$$t_d = t_r - t_s.$$

As with many mechanical systems, assemblies in a disk drive do not behave perfectly; disk rotation speed, actuator arm movements and other components exhibit minor variations. Therefore, in a preferred embodiment, a delay period slightly less than $t_d$ is used in practice. The actual value for this safety factor is not universal to every disk drive. Some hard-drives are manufactured to tighter mechanical tolerances than others and, therefore, empirical determination of the safety factor is a preferred method. However, a safe estimate for, current, commercially available hard drives, is a delay period approximately equal to-one millisecond.

CONCLUSION

A system and method has been shown in the above embodiments for the effective implementation of delaying a seek for a waiting disk access command that allows for as much data to be prefetched as possible and still not delay the waiting command. While various embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer operating system, computer hardware platform, disk head architecture, disk head actuators, magnetic media composition, areal density, tracks-per-inch, sectors-per-track, bytes-per-sector, servo arrangement, disk drive bus interface, disk data encoding method, fixed record density disks, or zoned-bit recording disks. In addition, the present invention can be implemented locally on a single PC, connected workstations (i.e., networked-LAN), across extended networks such as the Internet or using portable equipment such as laptop computers or wireless equipment (RF, microwaves, infrared, photonic, etc.)

What is claimed is:

1. A method of continuing prefetching between first and second disk access commands received by a disk drive comprising the steps:

calculating a delay period;

delaying a start of a seek for said second disk access command by said delay period;

continuing a prefetching operation, initiated by said first disk access command, during said delay period, and wherein said prefetching operation does not interfere with said second disk access command.

2. A method of continuing prefetching between first and second disk access commands received by a disk drive, according to claim 1, wherein said step of calculating a delay period comprises the following additional steps:

determining a seek time between said first and second disk access commands;

determining an angular difference between said first and second disk access commands;

calculating a rotation time corresponding to said angular difference;

if said rotation time is less than said seek time, then increasing said rotation time to a value greater than said seek time, and calculating said delay period by subtracting said seek time from said rotation time.

3. A method of continuing prefetching between first and second disk access commands received by a disk drive, according to claim 1, which comprises the additional step:

calculating a number of data sectors to be prefetched during said delay period.

4. A method of continuing prefetching between first and second disk access commands received by a disk drive, according to claim 3, wherein said number of data sectors is calculated according to $n=(t_d/t_{rev})(s_d)$ where $n$=said number of data sectors;

$t_d$=said delay period;

$t_{rev}$=time period for said disk drive to complete a single revolution, and $s_d$=number of data sectors per track of said disk drive.

5. A method of delaying a seek of a disk access command performed by a disk drive comprising the steps:

calculating a seek time period between first and second disk access commands;

calculating a rotational time period between said first and second disk access commands;

calculating a delay period, based on said seek time period and said rotational time period, to delay a start of a seek for said second command;

delaying said start of said seek by said delay period;

continuing a prefetching operation, initiated by said first command, during said delay period, and wherein said prefetching operation is completed before a start of said second disk access command without delaying of said start of said second disk access command.

6. A method of delaying a seek of a disk access command performed by a disk drive, as per claim 5, wherein said delay period is calculated by one of the following steps:

a) if said rotational time period is greater that said seek time period, then subtracting said seek time period from said rotational time period, and b) if said rotational time period is less than said seek time period, then increasing said rotational time period to a magnitude greater than said seek time period and then subtracting said seek time period from said rotational time period.

7. A method of delaying a seek of a disk access command performed by a disk drive, as per claim 6, wherein said conditional step of increasing said rotational time period is performed by iteratively adding to said rotational time period, a value equal to a time for said disk drive to complete a single revolution, until said rotational time period exceeds said seek time period.

8. A method of delaying a seek of a disk access command performed by a disk drive, as per claim 5, which comprises the additional step:

calculating a number of data sectors to be prefetched during said delay period.

9. A method of delaying a seek of a disk access command performed by a disk drive, as per claim 8, wherein said number of data sectors calculated according to $n=(t_d/t_{rev})(s_d)$ where $n$=said number of data sectors;

$t_d$=said delay period;

$t_{rev}$=time period for said disk drive to complete a single revolution, and $s_d$=number of data sectors per track of said disk drive.

10. An apparatus for performing non-interfering prefetching of data which comprises:

a disk drive which receives a first and second disk I/O command;

a time calculator which determines a delay period;

a disk controller which delays a start of a seek for said second disk I/O command for a time period equal to said delay period, said disk controller also performs a prefetching of data, initiated by said first disk I/O command, during said time period, and wherein said prefetching of data is completed before a start of said second I/O command without delay of said start of said second I/O command.

11. An apparatus for performing non-interfering pre fetching of data, as per claim 10, wherein said calculator determines said delay period according to a method comprising the steps:

determining a seek time between said first and second disk I/O commands; determining an angular difference between said first and second disk I/O commands;

calculating a rotation time corresponding to said angular difference;

if said rotation time is less than said seek time, then increasing said rotation time to a value greater than said seek time, and determining said delay period by subtracting said seek time from said rotation time.

12. An apparatus for performing non-interfering prefetching of data, as per claim 11, wherein said conditional step of increasing said rotation time is performed by iteratively adding to said rotation time, a value equal to a time for said disk drive to complete a single revolution, until said rotation time exceeds said seek time.

13. An apparatus for performing non-interfering prefetching of data, as per claim 10, wherein both said seek time and said angular difference between said first and second disk I/O commands are determined by considering an ending of said first disk I/O command and a beginning of said second disk I/O command.

14. An apparatus for performing non-interfering prefetching of data, as per claim 10, wherein said disk controller also calculates a number of data sectors to prefetch.

15. An apparatus for performing non-interfering prefetching of data, as per claim 14, wherein said number of data sectors is calculated according to $n=(t_d/t_{rev})(s_d)$ where $n$=said number of data sectors;

$t_d$=said delay period;

$t_{rev}$=time period for said disk drive to complete a single revolution, and $s_d$=number of data sectors per track of said disk drive.

16. An apparatus for performing non-interfering prefetching of data which comprises:

a disk drive which receives a first and second disk I/O command;

a time calculator which determines a delay period;

a disk controller which delays a start of a seek for said second disk I/O command for a time period equal to said delay period, said disk controller also performs a prefetching of data, initiated by said first disk I/O command, during said time period;

a read buffer which stores data retrieved by said prefetching of data, said read buffer additionally functions as a read cache, and wherein said prefetching of data is completed before a start of said second I/O command without delaying said start of said second I/O command.

17. An apparatus for performing non-interfering prefetching of data, as per claim 16, wherein said time calculator comprises the additional elements:

an estimator which determines a seek time between said first and second disk I/O commands;

an angle calculator which calculates a rotation time corresponding to an angular difference between said first and second I/O commands;

a comparator which determines if said rotation time is greater than said seek time;

an incrementor which increments, if necessary, said rotation time to a value greater than said seek time, and a subcontractor which determines said delay period by subtracting said seek time from said rotation time.

* * * * *